(No Model.)

C. H. STEAVENS.
PLOW WHEEL.

No. 364,735.  Patented June 14, 1887.

Witnesses
John Enders Jr
[signature]

Inventor
Charles H. Steavens,
By his Attorney
Patrick O'Farrell.

UNITED STATES PATENT OFFICE.

CHARLES H. STEAVENS, OF ST. JOHN'S, MICHIGAN.

PLOW-WHEEL.

SPECIFICATION forming part of Letters Patent No. 364,735, dated June 14, 1887.

Application filed March 17, 1887. Serial No. 231,271. (No model.)

*To all whom it may concern:*

Be it known that I, CHARLES H. STEAVENS, a citizen of the United States of America, residing at St. John's, in the county of Clinton and State of Michigan, have invented certain new and useful Improvements in Plow-Wheels, of which the following is a specification, reference being had therein to the accompanying drawings.

This invention pertains to certain new and useful improvements in plow-wheels; and it consists in the detailed construction, combination, and arrangement of the parts, substantially as hereinafter fully set forth, and particularly pointed out in the claim.

Figure 1:
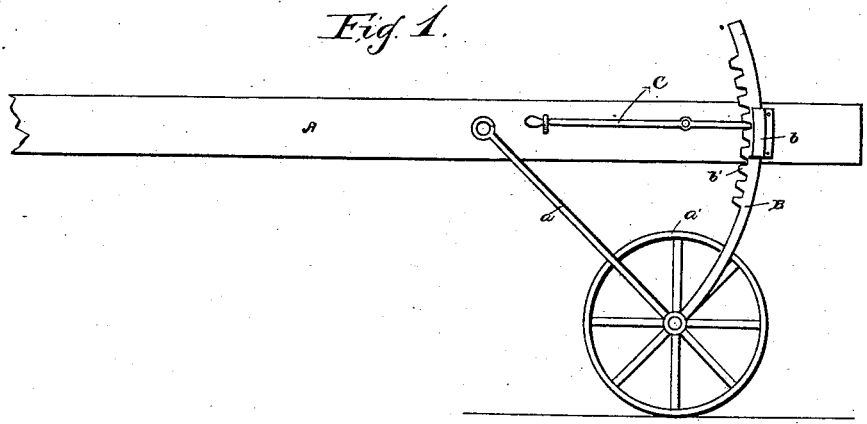
Figure 2:
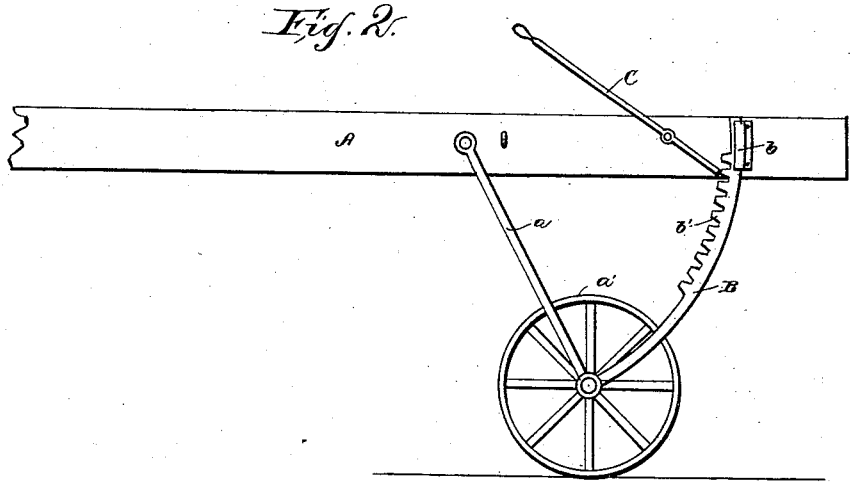

In the accompanying drawings, Figures 1 and 2 are views in side elevation of my invention.

In carrying out my invention, which may be applied almost to any form of plow-wheel, I pivotally connect to the plow-beam A the upper rearmost ends of two inclined parallel bars, $a$, between the forward ends of which is secured a small ordinary plow-wheel, $a'$, designed to bear on the ground or soil. To the axle of this plow-wheel $a'$ is connected the lower end of a curved bar or standard, B, which projects upwardly on one side of the plow-beam and is held as against lateral movement by means of a bent plate, $b$, secured to said plow-beam, so as to permit the passage of the bar or standard B between its outer right-angular portion and the side of the plow-beam. This bar or standard B has a series of approximately semicircular ratchet-teeth, $b'$, projecting from one side thereof, as shown, the purpose of which will soon appear.

C is a lever pivoted near its forward end to one side of the plow-beam A, the forward end of said lever being designed to fit snugly between any two of the teeth or ratchets of the bar or standard B, the purpose of which will now appear.

In operation, when it is desired to adjust the forward end of the plow-beam so as to regulate the depth of penetration of the plow-point in the soil or ground, the upper end of the inclined bar or standard is grasped and raised or lowered the desired extent, after which the rear handle-like end of the lever C is forced downward, causing the forward end of said lever to enter between any two of the teeth or ratchets of said bar or standard, and by securing, by a hook or other means, the rear end of the lever, when the same is in a horizontal position, the bar or standard will be firmly locked or held in position as against accidental displacement.

The advantages of my invention are obvious; but the principal feature is dispensing with wrenches and like instruments for tightening and adjusting nutted bolts and rods for holding or locking the parts.

I am aware that many devices of various construction have heretofore been employed for the adjustment of a plow-wheel, and hence I do not make broad claim thereto, my invention being designed as an improvement over such devices and having for its object simplicity and durability.

Having thus fully described my invention, what I claim, and desire to secure by Letters Patent, is—

The combination, with the plow-beam, its wheel, and the inclined brackets supporting the axle of said wheel, of the curved bar or standard guided by a right-angular plate and having teeth in one side, and the pivoted lever entering said teeth and secured, when lowered, by ordinary means, substantially as shown and described.

In testimony whereof I affix my signature in presence of two witnesses.

CHARLES H. STEAVENS.

Witnesses:
PORTER K. PERRIN,
ALBERT J. BALDWIN.